(12) United States Patent
Alexandre

(10) Patent No.: US 6,729,348 B1
(45) Date of Patent: May 4, 2004

(54) COUPLING ASSEMBLY FOR PETROLEUM LIQUEFIED GAS WITH QUICK FASTENING AUTOMATIC DISCONNECTION AND RETENTION AND RELIEF VALVE

(75) Inventor: Guiliani Alexandre, Estrada do Mato Dentro, 265, monte Verde, Sorocaba, Sao Paulo, 18100-000 (BR)

(73) Assignee: Guiliani Alexandre, Sao Paulo (BR)

( * ) Notice: Subject to any disclaimer, the term of this patent is extended or adjusted under 35 U.S.C. 154(b) by 0 days.

(21) Appl. No.: 09/936,097

(22) PCT Filed: Mar. 8, 2000

(86) PCT No.: PCT/BR00/00020
§ 371 (c)(1),
(2), (4) Date: Feb. 20, 2002

(87) PCT Pub. No.: WO00/53967
PCT Pub. Date: Sep. 14, 2000

(30) Foreign Application Priority Data

Mar. 8, 1999 (BR) .................................................. 990971

(51) Int. Cl.[7] ............................................... F16L 37/28
(52) U.S. Cl. ................................. 137/614.05; 137/322
(58) Field of Search ....................... 137/614.05, 614.03, 137/322, 614

(56) References Cited

U.S. PATENT DOCUMENTS

| | | | | |
|---|---|---|---|---|
| 3,759,291 A | * | 9/1973 | Moore et al. ............... | 137/588 |
| 4,844,123 A | * | 7/1989 | Wick ........................... | 137/322 |
| 4,988,129 A | | 1/1991 | Saito et al. | |
| 5,129,423 A | | 7/1992 | Fournier et al. | |
| 5,365,972 A | | 11/1994 | Smith, III | |
| 5,398,723 A | | 3/1995 | Allread et al. | |
| 6,000,419 A | * | 12/1999 | Bernhard ........... | 137/614.05 X |
| 6,314,986 B1 | * | 11/2001 | Zheng et al. ............... | 137/240 |

* cited by examiner

Primary Examiner—Kevin Lee
(74) Attorney, Agent, or Firm—Robert D. Buyan; Stout, Uxa, Buyan & Mullins, LLP.

(57) ABSTRACT

It has a fastening system (FIG. 1) of manual operation by a simple effort, being this system designed in order to disconnect the system in case of an internal increase of pressure occur protecting this way the rest of the system and the gas supply from this pressure increase. It also contains a retention valve (FIG. 2) to seal the steel container when disconnected. The relief valve (FIG. 3) placed inside the retention valve pin, purposes only to liberate the excess gas in order to have the pressure back to the standard safety level, being very important in case of accident and/or fire the relief valve pressure level is higher than the automatic disconnection pressure level in case the transmission system is in operation, this way first the fastening system is liberated and after the relief valve is liberated, but lower than the maximum test pressure of the steel container.

7 Claims, 6 Drawing Sheets

US 6,729,348 B1

COUPLING ASSEMBLY FOR PETROLEUM LIQUEFIED GAS WITH QUICK FASTENING AUTOMATIC DISCONNECTION AND RETENTION AND RELIEF VALVE

BACKGROUND OF THE INVENTION

The current patent has the purpose to present the adapted solutions to one only assembly, facilitating the use of Petroleum Liquefied Gas (GLP), minimizing customers efforts in their homes and workplaces, and increase the safety during its use as well as during transportation and warehousing, being this assembly, mounted on the steel container's mouth used in transportation and storage of the petroleum liquefied gas. The technics state for the valve used on the containers mouth is regulated by the Norm NBR 6614, the pressure regulator for the petroleum liquefied gas is regulated by the Norm NBR 8473, and the steel container used for transportation and storage of the petroleum liquefied gas, by NBR 8460. These norms are issued by the Brazilian Technical Norms Association (ABNT).

The utilization in large scale of the petroleum liquefied gas (GLP), in households as well as in business and industries, causes inconvenient risks to the users, risks on storage and transportation by the distribution system, by the incorrect handling on the exchange of containers, and also the storage during use.

In the places where the petroleum liquefied gas is used there is no condition to measure the available quantity, and for this reason the exchange of the empty container by the full one has to be performed while the gas is burning or with the burning in operation (for example: stove, water, heating, forklifts, etc.), causing a significant waste of time. It is frequent that the lack of tools to exchange the containers make the disconnection of the thread impossible, caused by rust or the thread's high torque and even the physical strength of the user impedes the completion of the activity. When connecting the full container, starting to turn the thread before the sealing of the regulator pin with the rubber ring, the retention valve is already open causing a little leakage, and it is worse when the operation in turning into the thread occurs incorrectly, which can cause a thread damage maintaining the pin out of its proper place causing a continuous leakage of gas into the environment, many times, in trying to exchange, some wounds and cuts to the person because of space conditions and the size of the pressure regulator lever occur.

Another problem is that during the steel container's filling up with the petroleum liquefied gas, there exists a little leakage, but it is considerable taking into consideration the volume of the filling operation daily into the environment.

Another inconvenience is the storage and transportation, because the current safety valve used, break itself with the increasing of internal pressure caused by the volume decrease (e.g. caused by the container crash) or by increase of temperature caused by fire, in both cases, all gas is liberated into the environment increasing the fuel available for combustion, and therefore incurring a lot the risk of fire in the first case and the size of fire in the second one. This also happens when the user stores the container in an improper place and/or manner, especially when not aware of this problem.

SUMMARY OF THE INVENTION

Thinking about all the inconvenience and in increasing the safety, without affecting the filling up operation, and therefore the distribution system this assembly was projected and is composed of:

quick fastening and disconnection system, where it happens by a simple effort and movement applied by the regulator's pin on the spheres and with a contrary force in the disconnection, performing also with safety because the disconnection happens automatically when a pre-determined pressure set in the project is reached, protecting the rest of the system against the increase of pressure;

double sealing system in the fastening of the steel container with the pressure regulator pin in order to avoid that the retention valve open before the sealing by the rubber rings occur avoiding the leakage into the environment;

the retention valve sealing system with guided pin in order to avoid that the sealing is damaged when the container is not fastened;

the relief valve safety system which by the internal pressure increase, because of the above mentioned problems, liberates enough volume of gas in order to decrease the internal pressure returning to the sealing position.

The attached drawing are in numerical conformity among themselves presenting a kit:

DETAILED DESCRIPTION OF THE DRAWINGS

Figure 1:
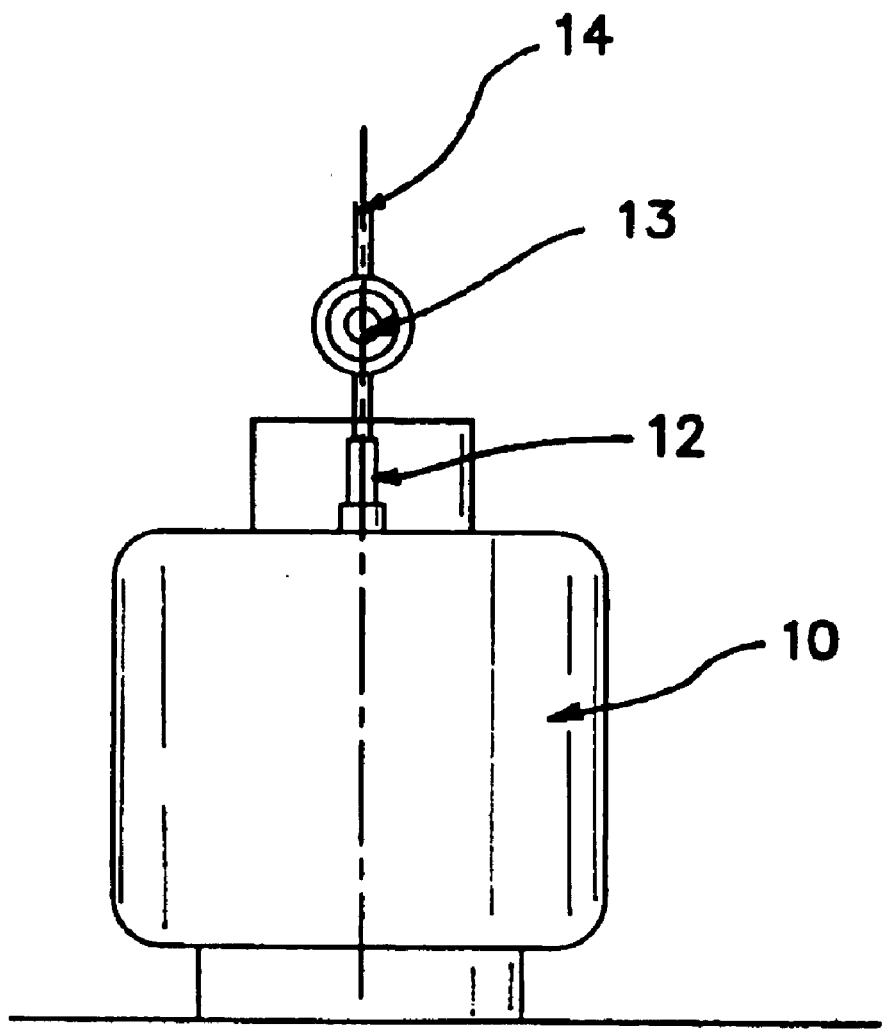
FIG. 1 is a front view showing a petroleum liquefied gas transmission system incorporating the coupling assembly of the present invention.

Turning now to the drawings in which like reference characters indicate corresponding elements throughout the several views, attention is first directed to FIG. 1, which shows a standard installation scheme for a petroleum liquefied gas installation system, comprising a pressurized vessel such as a steel container 10 for storage and transport of the petroleum liquefied gas, a quick-disconnect coupling assembly 12 according to the present invention, a pressure regulator 13, and a PVS hose 14.

With additional reference to FIGS. 2–5, the coupling assembly 12 comprises a pair of coaxially aligned sleeve elements 18, 20 configured to receive a pin 16 depending from the pressure regulator 13. The coupling assembly 12 is preferably mounted within a bushing 19 welded within the mouth of pressurized vessel 10. The assembly 12 allows an operator to insert the pin 16 into the sleeve elements 18, 20 simply by pushing the pin 16 in the straight downward direction, as shown by arrow A in FIG. 2. The straight path of the pin 16 in the sleeve elements 18, 20 makes it easier to insert the pin 16 fully into the sleeve elements without allowing any leakage of gas during exchange of the container 10. The pin 16 is pushed downwardly within the lower sleeve 20, until the distally tapered lower surface of an annular shoulder 21 formed on the pin 16 contacts spheres 22 carried within the sleeve elements 18, 20, causing the sleeve elements 18, 20 to travel in the same direction as the pin 16, at the same time exerting tension on a first biasing element, such as a spring, 24 mounted between the sleeve elements 18, 20 and the fastening body 26. Downward movement of the sleeve elements 18, 20 continues until the spheres 22 are received in a channel or recess 27 formed in the fastening body 26, thereby preventing further distal movement of the sleeve elements, while allowing continued movement of the pin 16. By this time, the distal end of the pin 16 has already passed through a pair of aligned sealing rings 30, 32 in the tightening body, or retention valve housing, 48 and contacted the stem 34 of the retention valve 41, causing the retention valve 41 to open.

The opening of the retention valve 41 allows the fluids in the pressurized vessel 10 to exert forces on the distal end of the pin 16, thereby causing the spring 24 to retract to its neutral original position. As the spring 24 retracts, it pulls the sleeve elements 18, 20 proximally and releases the spheres 22 from the recess 27, making a metallic clicking sound. Finally, the proximally tapered upper surface 40 of the annular shoulder 21 of the pin 16 comes to rest against the spheres 22, latching the pin 16 within the fastening body 26.

Figure 2:
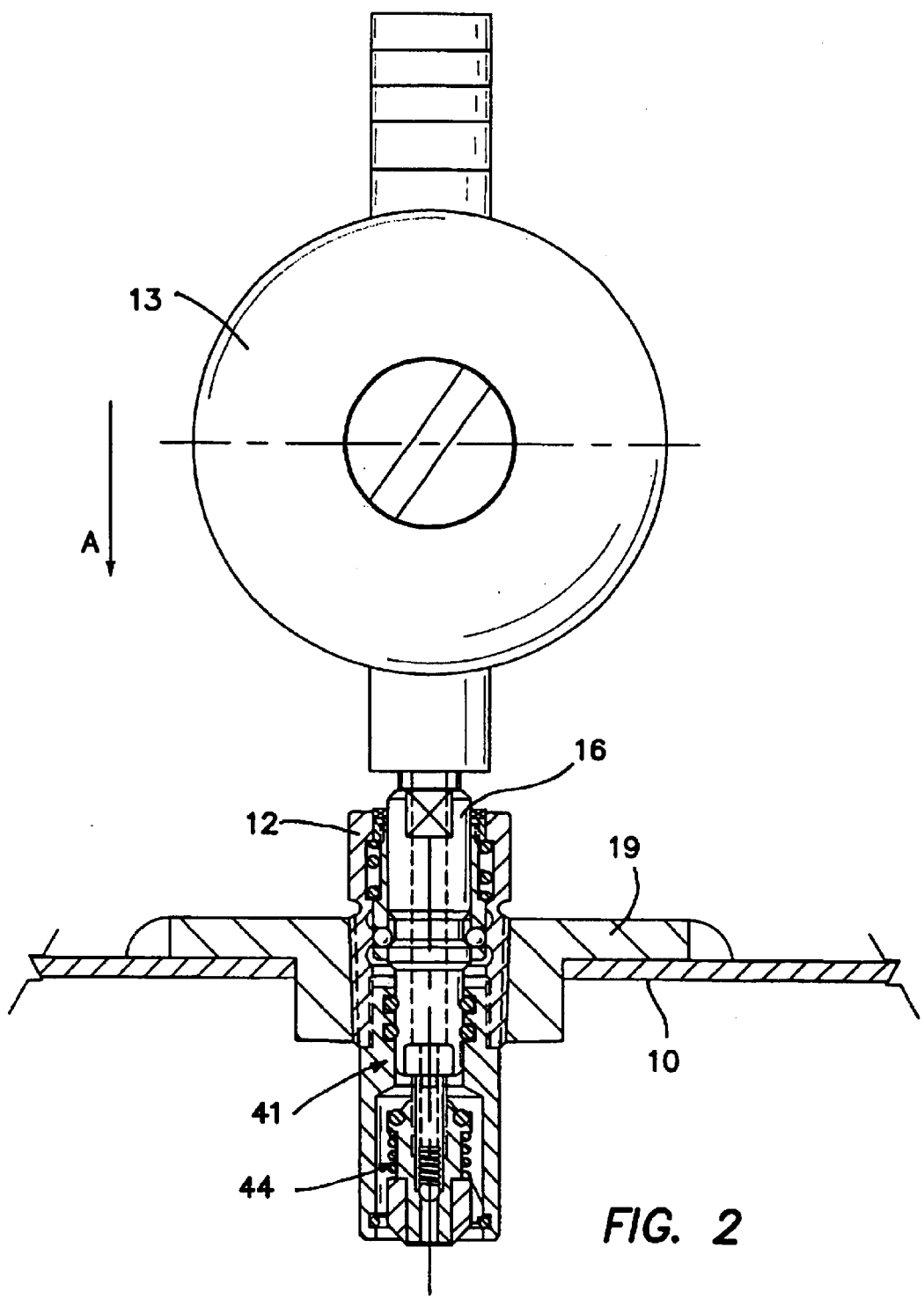
FIG. 2 is a longitudinal sectional view, not to scale, showing the coupling assembly and pressure regulator of FIG. 1 in fastened position.
Figure 3:
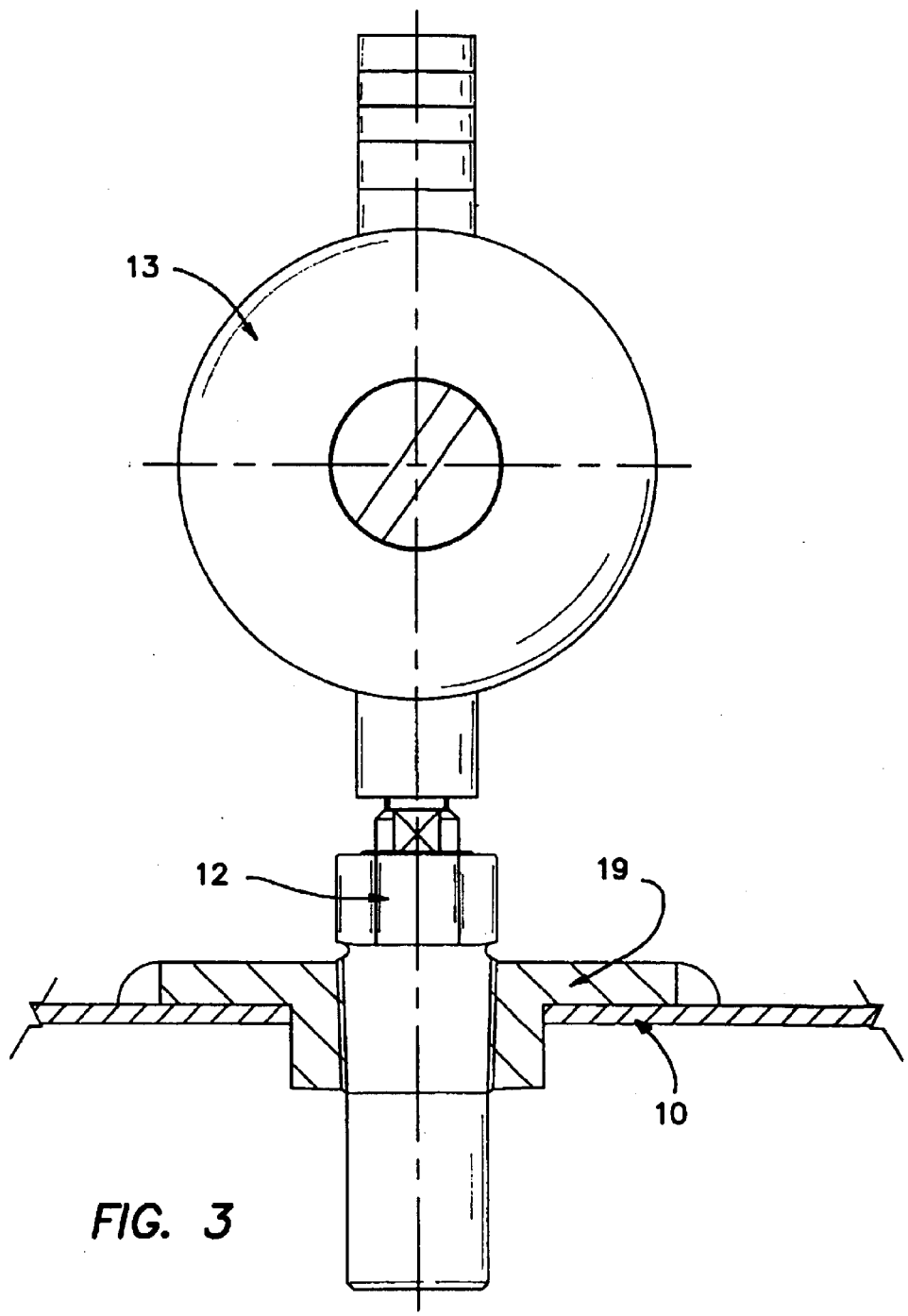
FIG. 3 is a partial sectional view, not to scale, showing the coupling assembly and pressure regulator of FIG. 1 in fastened position.
Figure 4:
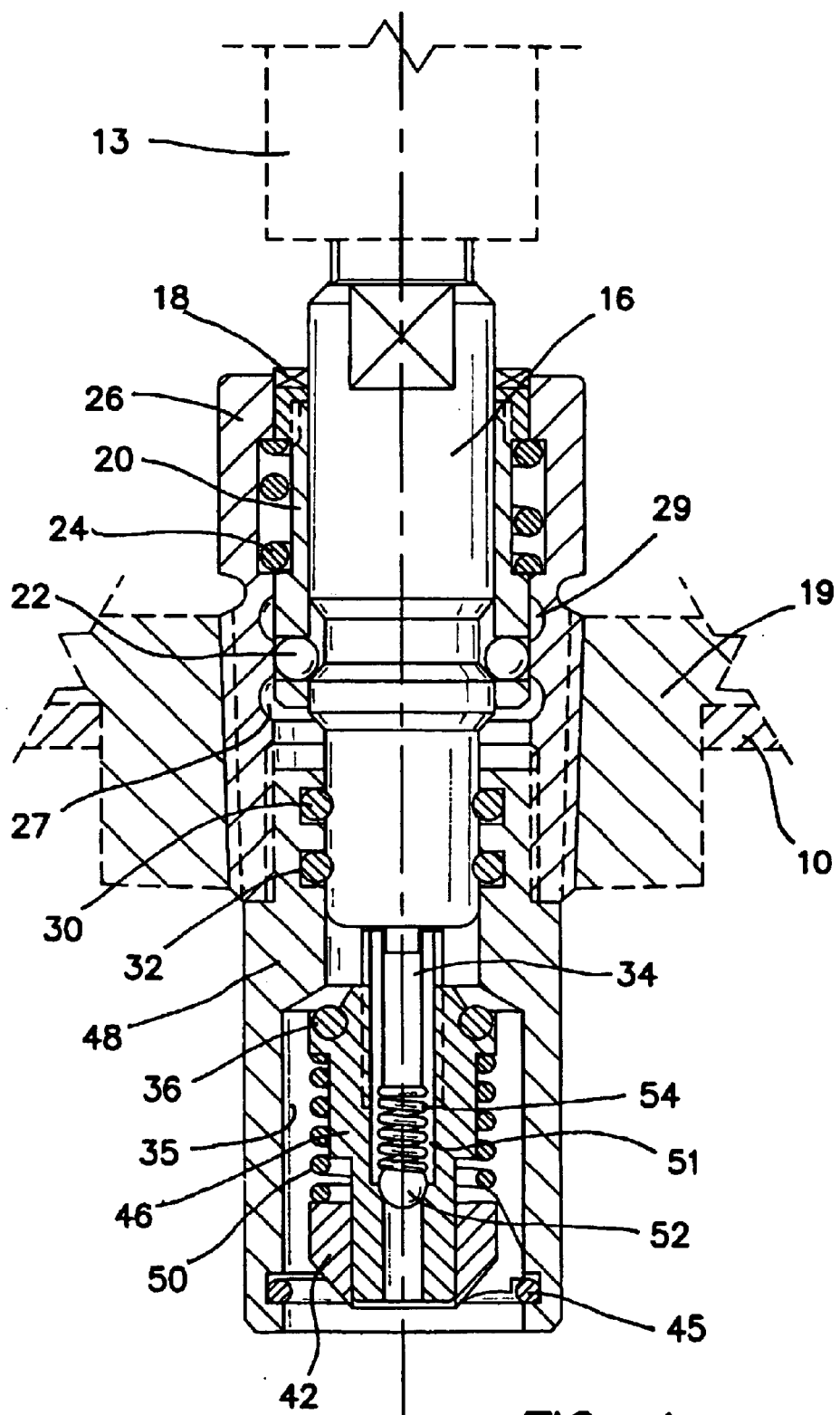
FIG. 4 is a longitudinal sectional view showing the coupling assembly of the present invention in 2:1 scale.
Figure 5:
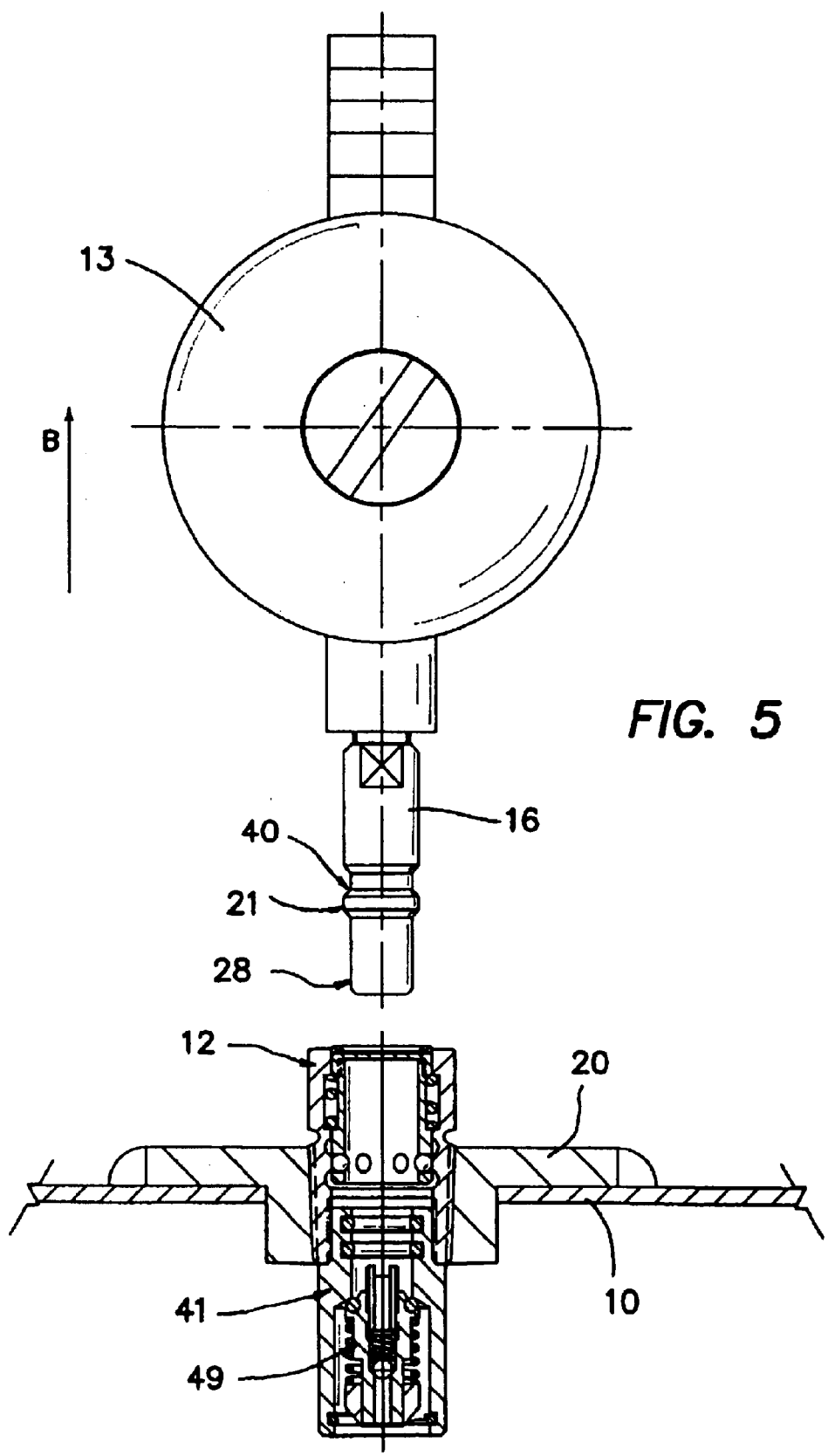
FIG. 5 is a longitudinal sectional view, similar to FIG. 2, showing the coupling assembly unfastened from the pressure regulator.

When the system is fastened, as shown in FIGS. 2 and 3, the force exerted by the spheres 22 on the tapered upper surface 40 of the annular shoulder 21 of the pin is substantially equal to the force of the spring 24, so that the system is in equilibrium. However, if pressure within the vessel 10 becomes excessive, the forces exerted by the pin 16 on the spring 24 increase, eventually causing the spring 24 to compress in the direction indicated by the letter B in FIG. 5, allowing the pin 16 and sleeve elements 18, 20 to move upwardly until the spheres 22 reach a second channel or recess 29, liberating the pin 16 and disconnecting the pressure regulator 13 from the fastening body 26.

Figure 6:
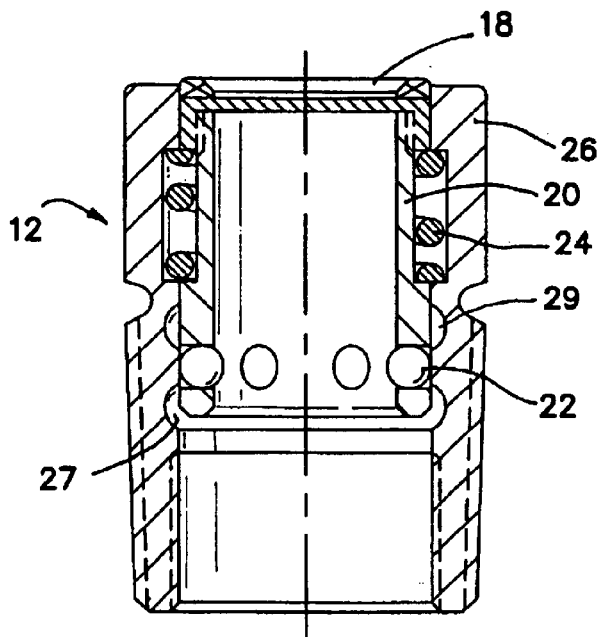
FIG. 6 is a longitudinal sectional view of a fastening and disconnection system according to the present invention, in 2:1 scale.
Figure 7:
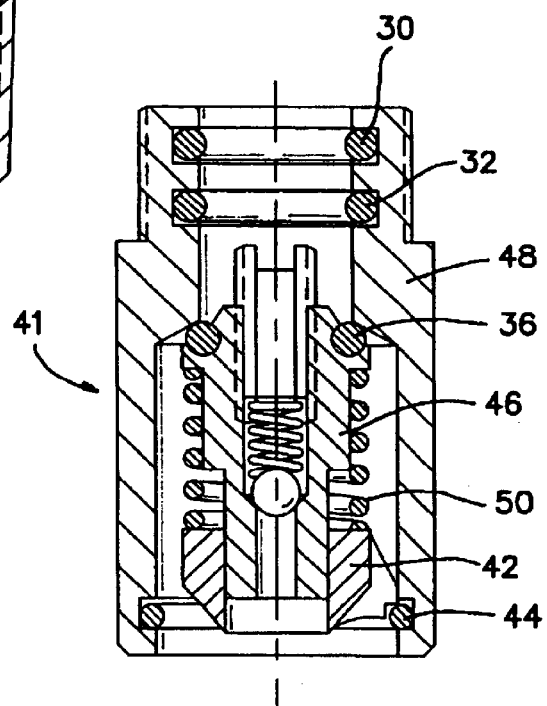
FIG. 7 is a longitudinal sectional view showing a retention valve body according to the present invention, in 2:1 scale.
Figure 8:
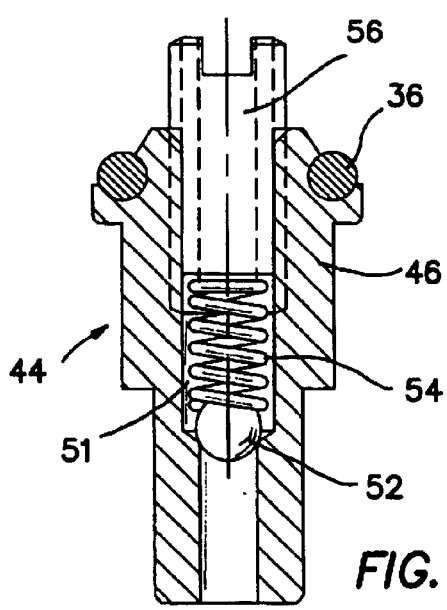
FIG. 8 is a longitudinal sectional view showing a retention valve pin according to the present invention, in 3:1 scale.

The retention valve 41, best seen in FIG. 6, is designed to close immediately upon disconnection of the pressure regulator from the fastening body, and to open only after the system has been securely fastened and sealed, as described above. In addition, the area of the retention valve chamber 35 is selected to provide maximum flow during the vessel's filling operation. A sealing ring 36 is provided on the proximal end of the retention valve body, or retention pin 46, and a displacement guide 42 and guide tightening ring 445 are provided to maintain the sealing ring 36 at a proper angle relative to the retention valve housing, or tightening body, 48, even if the spring 50 varies the contact angle.

The retention valve body 46 includes an internal relief valve 49, comprising a sphere 52 which normally seals off the relief valve passage 51. The sphere is connected to the hollow stem, or screw, 34 of the retention valve 41 by a compression spring 54, wherein the force needed to overcome the force exerted by the spring on the sphere determines the pressure at which the relief valve 49 opens. This pressure is selected to be greater than the pressure at which the pressure regulator 13 automatically disconnects from the vessel 10, but less than the maximum test pressure of the vessel.

Various modifications and variations to the embodiments herein chosen for purposes of illustration will readily occur to those skilled in the art. For instance, the assembly may be produced in different sizes to account for variations in such factors as the size of the external thread for the container's mouth, the fastening force, the internal disconnection pressure, and the flow rate through the valves. To the extent that such variations and modifications do not depart from the spirit of the invention, they are intended to be included within the scope thereof which is assessed only by a fair interpretation of the following claims.

What is claimed is:

1. A system for enhancing the safety of a pressurized vessel having an opening, the system comprising:

a) a fastening assembly for coupling a pressure regulator to the pressurized vessel and for automatically disconnecting the pressure regulator when pressure within the vessel reaches a predetermined first value;

b) a retention valve assembly for preventing escape of fluid from the pressurized vessel immediately upon disconnection of the pressure regulator; and c) a relief valve assembly for venting fluid from the pressurized vessel when pressure within the vessel reaches a predetermined second value higher than the first value.

2. A system according to claim 1, wherein the fastening assembly comprises:

a pin depending from the pressure regulator;

a fastening body positioned in the opening of the vessel and adapted to receive the pin;

a latching mechanism responsive to axial movement of the pin to secure the pin within the fastening body; and a release mechanism for releasing the pin from the fastening body when pressure within the vessel reaches the first value.

3. A system according to claim 2, wherein the pin comprises:

a distal tip adapted to open the retention valve assembly, allowing fluid communication between the pressure regulator and the pressurized vessel, when the pin is fully inserted in the fastening body; and an element provided proximally of the distal tip for actuating both the latching mechanism and the release mechanism.

4. A system according to claim 3 wherein:

a) the latching mechanism comprises:

a sleeve mounted for axial movement within a bore of the fastening body, the sleeve including a bore configured to receive the pin;

at least one spherical member carried by the sleeve;

at least one recess formed in the fastening body distally of the sleeve and configured to receive the at least one spherical member;

a first biasing element mounted between the sleeve and the fastening body for urging the sleeve to a first position within the bore of the fastening body; and b) the actuating element of the pin includes:

a distally tapered surface configured to contact the at least one spherical member in the sleeve when the pin is manually inserted into the sleeve, thereby moving the sleeve in the distal direction against the bias of the spring until the at least one spherical member is received in the at least one recess, thus preventing further distal movement of the sleeve while still allowing distal movement of the pin; and a proximally tapered surface configured to contact the at least one spherical member when the pin moves proximally in the sleeve in response to pressure exerted on the pin by fluid in the pressurized vessel when the retention valve assembly is open, thus causing the spherical member to move distally out of at least one recess and allowing the sleeve to return to its first position, the at least one spherical member thereafter abutting against the proximally tapered surface to prevent further proximal movement of the pin within the sleeve.

5. A system according to claim 4, wherein:

a) the first biasing element is a spring having a stiffness selected such that the spring is compressed when the pressure in the vessel reaches the first value; and b) the release mechanism comprises at least one second recess formed proximally of the at least one recess and configured to receive the at least one spherical member; wherein forces exerted on the pin when the pressure in the vessel reaches the first value cause the pin and sleeve to move in a proximal direction until the at least one spherical member is received in the at least one second recess, thereby allowing the actuating element of the pin to clear the at least one spherical member, and causing the pressure regulator to disconnect from the pressurized vessel.

6. A system according to claim 1, wherein the retention valve assembly comprises:

a) a retention valve housing defining a retention valve chamber;

b) a retention valve seat formed in the valve chamber;

c) a retention valve body mounted for movement within the valve chamber, d) a second biasing element for urging the retention valve body toward a closed position against the retention valve seat, and e) a retention valve stem coupled to the retention valve body, the retention valve stem having a surface adapted to engage a pin depending from the pressure regulator when the pin is inserted through the fastening body, wherein a force exerted by the pressure regulator pin on the retention valve stem maintains the valve body in an open position away from the valve seat as long as the pressure regulator is coupled to the pressure vessel, and wherein removal of the pin allows the retention valve body to return to the closed position against the valve seat.

7. A system according to claim 6, wherein the relief valve assembly comprises:

a) a relief valve chamber extending through the retention valve body, the relief valve chamber including a small diameter portion facing the opening of the pressure vessel and a large diameter portion receiving the retention valve stem, b) a relief valve seat formed at an intersection between the large and small diameter portions of the relief valve chamber;

c) a relief valve body mounted for movement within the relief valve chamber, d) a third biasing element extending between the retention valve stem and the relief valve body, and normally urging the relief valve body against the relief valve seat with a pressure approximately equal to the second value, and e) a relief valve passage extending through the retention valve stem, the relief valve passage communicating at one end with the small diameter portion of the relief valve chamber and at another end with the small diameter portion of the retention valve chamber, wherein an increase in pressure in the pressurized vessel to a value at or above the second value causes the relief valve body to move away from the relief valve seat, against the bias of the third biasing element, thereby allowing fluid in pressure vessel to escape through the relief valve passage until the pressure in the pressure vessel returns to a value at or below the second value.

* * * * *